United States Patent
Park et al.

[11] Patent Number: 6,031,660
[45] Date of Patent: Feb. 29, 2000

[54] ANALOG/DIGITAL DOUBLE AUTOMATIC POWER CONTROLLING DEVICE IN AN OPTICAL FIBER AMPLIFIER

[75] Inventors: Bong-Jin Park; Do-Hyung Lee, both of Taegukwangyok-shi, Rep. of Korea

[73] Assignee: Samsung Electronics Co., Ltd., Kyungki-do, Rep. of Korea

[21] Appl. No.: 09/137,532

[22] Filed: Aug. 21, 1998

[30] Foreign Application Priority Data

Aug. 22, 1997 [KR] Rep. of Korea ............ 97-40280
Jul. 23, 1998 [KR] Rep. of Korea ............ 98-29585

[51] Int. Cl.[7] .................................................. H01S 3/00
[52] U.S. Cl. ........................................ 359/341; 359/124
[58] Field of Search ................................ 359/341, 177, 359/134, 124, 161

[56] References Cited

U.S. PATENT DOCUMENTS

| | | |
|---|---|---|
| 5,268,786 | 12/1993 | Matsushita et al. ............ 359/341 |
| 5,633,750 | 5/1997 | Nogiwa et al. ............ 359/341 |
| 5,673,129 | 9/1997 | Mizrahi . | 
| 5,703,711 | 12/1997 | Hamada ............ 359/341 |
| 5,768,012 | 6/1998 | Zanoni et al. . |
| 5,912,760 | 6/1999 | Sugiya ............ 359/341 |
| 5,923,462 | 7/1999 | van der Plaats ............ 359/341 |

*Primary Examiner*—Mark Hellner
*Attorney, Agent, or Firm*—Robert E. Bushnell, Esq.

[57] ABSTRACT

There is provided a device for automatically the output of a pump laser diode used as an excitation light source in an erbium doped fiber amplifier (EDFA). The automatic power controlling device can stabilize an optical signal output via a final output terminal in an optical fiber amplifier by selecting a first feedback control loop using an output photodiode or a second feedback control loop using a photodiode provided in a pump laser diode, and controlling an optical excitation signal output from the pump laser diode on the basis of the intensity of an output optical signal detected through the selected feedback control loop in an analog or digital double automatic controlling method.

29 Claims, 7 Drawing Sheets

ANALOG/DIGITAL DOUBLE AUTOMATIC POWER CONTROLLING DEVICE IN AN OPTICAL FIBER AMPLIFIER

CLAIM OF PRIORITY

This application makes reference to, incorporates the same herein, and claims all benefits accruing under 35 U.S.C §119 from two applications entitled *Analog/Digital Double Automatic Power Controlling Device In Optical Fiber Amplifier* earlier filed in the Korean Industrial Property Office on Aug. 22, 1997, and there duly assigned Ser. No. 97-40280 by that Office and filed in the Korean Industrial Property Office on May 23, 1998, and there duly assigned Ser. No. 98-29585 by that Office.

BACKGROUND OF THE INVENTION

1. Field of the Invention

The present invention relates to an optical fiber amplifier, and in particular, to a device for automatically controlling the output of a pump laser diode used as an exciting light source in an erbium-doped fiber amplifier (EDFA).

2. Description of the Related Art

An optical fiber amplifier generally amplifies a weak optical signal at a predetermined distance from a transmitter so that an optical signal converted from an electrical signal can be stably transmitted on a transmission medium, that is, an optical fiber to an intended destination. U.S. Pat. No. 5,768,012 to Raymond Zanoni et al. entitled *Apparatus And Method For The High-Power Pumping Of Fiber Optic Amplifiers* and U.S. Pat. No. 5,673,129 to Victor Mizrahi entitled *WDM Optical Communication Systems With Wavelength Stabilized Optical Selectors* are examples of known optical amplifiers.

The optical amplifier plays a significant role in optical communication through power amplification and preamplification, positioned between a transmitter/receiver and an optical line. Thus, efforts have been expended toward stabilizing the output of an optical transmission signal by use of the optical fiber amplifier.

As one of such efforts, there will be disclosed a method of stabilizing the output of a pump laser diode used to amplify an optical transmission signal in the optical fiber amplifier in an embodiment of the present invention.

SUMMARY OF THE INVENTION

An object of the present invention is to provide an analog/digital automatic power controlling device in an optical fiber amplifier, in which the output of a pump laser diode being an exciting light source is controlled using both a photodiode in the pump laser diode and a photodiode at an output end in order to stabilize a final output of the optical fiber amplifier.

To achieve the above object, there is provided an analog double automatic power controlling device in an optical fiber amplifier. The optical fiber amplifier has two optical isolators respectively positioned at input and output ends, for preventing reverse surge of a optical transmission signal, a wavelength division multiplexer (WDM) for multiplexing an externally input optical transmission signal and an optical excitation signal, a pump laser diode (LD) for generating the excitation signal, and an output tap at the output end, for dividing an amplified optical signal at a predetermined ratio. In the analog double automatic power controlling device, a pump laser diode controlling portion drives the pump laser diode to output the optical excitation signal, and automatically controls the intensity of the excitation signal on the basis of the level of a fed-back signal. A first feed-back controlling portion detects an optical signal divided at the predetermined ratio via the output tap, converts the optical signal to an electrical signal, and applies the electrical signal to the pump laser diode controlling portion. A second feed-back controlling portion detects the optical excitation signal output from the pump laser diode controlling portion, converts the optical excitation signal to an electrical signal, and applies the electrical signal to the pump laser diode controlling portion. A switch switches to connect one of the first and second feed-back controlling portions to the pump laser diode controlling portion. A switch controlling portion senses a current flowing through the pump laser diode, compares the sensed current level with a predetermined reference level, and generates a switch controlling signal to the switch on the basis of the comparison result, for causing the switch to select one of the two feed-back controlling portions.

According to another aspect of the present invention, there is provided a digital double automatic power controlling device in an optical fiber amplifier. The optical fiber amplifier has two optical isolators respectively positioned at input and output ends, for preventing reverse surge of a optical transmission signal, a WDM for multiplexing an externally input optical transmission signal and an optical excitation signal, a pump laser diode for generating the excitation signal, and an output tap at the output end, for dividing an amplified optical signal at a predetermined ratio. In the digital double automatic power controlling device, a pump laser diode driving portion converts a digital control signal to an analog signal and applies a driving current to the pump laser diode on the basis of the analog signal, for causing the pump laser diode to output an appropriate optical excitation signal. A first feed-back controlling portion detects an optical signal divided at the predetermined ratio by the output tap, converts the optical signal to an analog signal, and converts the analog signal to the digital signal. A second feed-back controlling portion detects the optical excitation signal output from the pump laser diode, converts the excitation signal to an analog signal, and converts the analog signal to a digital signal. A pump laser diode bias current sensing portion s senses a bias current of the pump laser diode and converts the sensed analog signal to a digital signal. A microprocessor compares the level of the digital signal received from the pump laser diode bias current sensing portion with a user preset pump laser diode bias current limit. According to the comparison result, the microprocessor controls the intensity of the optical excitation signal output from the pump laser diode on the basis of the digital signal received from the first feed-back controlling portion and an initially set reference output value of the optical fiber amplifier, to thereby keep a final output optical signal constant, or applies the digital control signal to the pump laser diode driving portion for keeping the optical excitation signal of the pump laser diode constant on the basis of the digital signal received from the second feed-back controlling portion and a reference pump laser diode output value initially set by a user.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Prior to the description of the present invention, attempts to stabilize the output of a pump laser diode in automatic power controlling devices will be described in short referring to FIGS. 1, 2, and 3.

Figure 1:
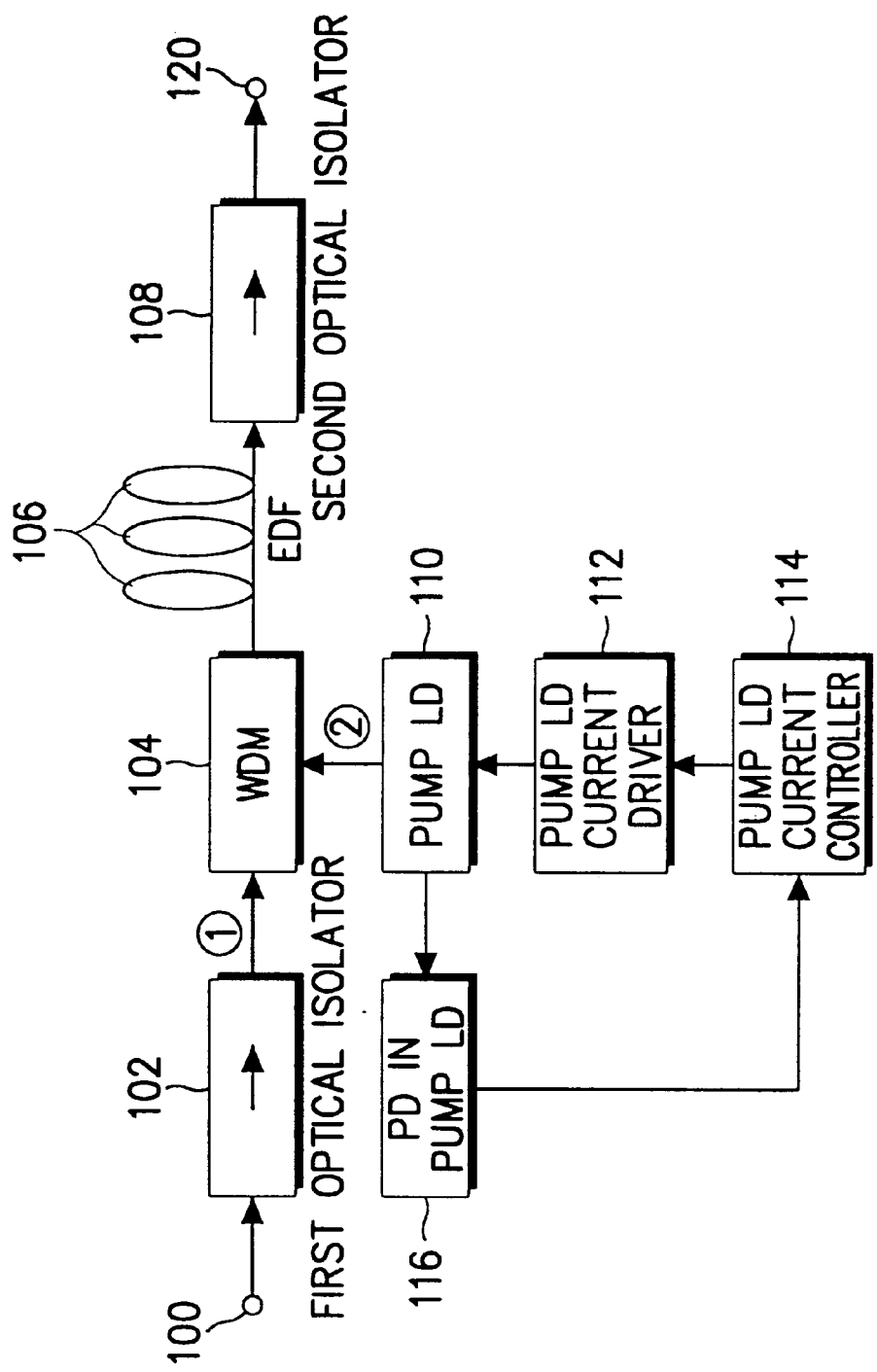
FIG. 1 is an exemplary block diagram of an analog automatic power controlling device using a photodiode in a pump laser diode in an optical fiber amplifier.

In FIG. 1, an automatic power controlling device uses a photodiode (PD) 116 in a pump laser diode 110. Photodiode 116 detects an optical excitation signal 2̂ which is fed from pump laser diode 110 to a wavelength division multiplexer (WDM) 104, converts the detected optical excitation signal to an electrical signal, and outputs the electrical signal to a pump laser diode current controller 114. Pump laser diode current controller 114 outputs a control current to a pump laser diode current driver 112 to control the output of pump laser diode 110. Pump laser diode current controller 114 compares the current level of the electrical signal received from photodiode 116 with a level preset by a user, and controls the intensity of the optical excitation signal output from pump laser diode 110 on the basis of the comparison result. Hence, this is a kind of feedback control circuit.

The above automatic power controller is advantageous in that the output of pump laser diode 110 is kept constant regardless of a variation in external temperature or in the intensity of an optical transmission signal externally input to the optical fiber amplifier, thereby lengthening the lifetime of pump laser diode 110. A final output, however, at an output terminal 120 becomes unstable because changed characteristics of the devices (i.e., a first optical isolator 102, WDM 104, an erbium-doped fiber 106, and a second optical isolator 108) other than the optical excitation signal generating devices due to temperature variation are not compensated for. Moreover, a changed intensity of the optical transmission signal received from an input terminal 100 unstably varies the output at the output terminal 120.

Figure 2:
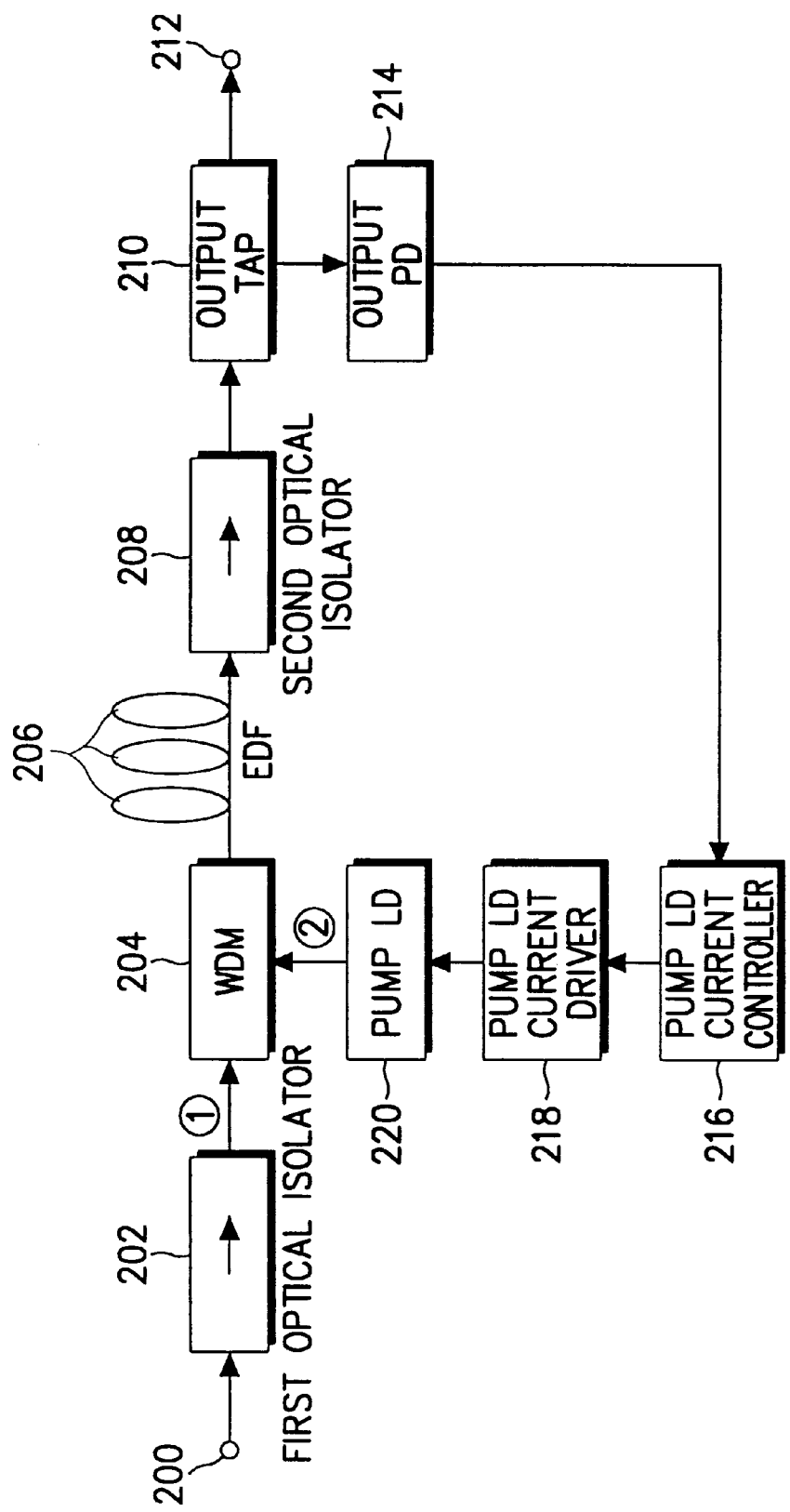
FIG. 2 is an exemplary block diagram of another analog automatic power controlling device using a photodiode at an output end in an optical fiber amplifier.

FIG. 2 is a block diagram of another automatic power controlling device using a photodiode at an output end (hereinafter, referred to as an output photodiode) in an optical fiber amplifier. Referring to FIG. 2, an output tap 210 divides an optical transmission signal at a predetermined ratio between an output terminal 212 and an output photodiode 214. Output photodiode 214 converts the optical signal received from output tap 210 to an electrical signal and feeds the electrical signal to a pump laser diode current controller 216. Pump laser diode current controller 216 outputs a control current to a pump laser diode current driver 218 in order to control the output of a pump laser diode 220 by comparing the current level of the electrical signal received from output photodiode 214 with a level preset by a user, and controls the intensity of the optical excitation signal 2̂ output from pump laser diode 220 on the basis of the comparison result, thereby stabilizing an optical transmission signal finally output from output terminal 212. Hence, this is also a kind of feedback control circuit.

By contrast with the automatic power controlling device shown in FIG. 1, even if characteristics of the devices (i.e., a first optical isolator 202, a WDM 204, an EDF 206, and a second optical isolator 208) except for the above optical excitation signal generating devices are changed due to a variation in temperature or in the intensity of an optical transmission signal externally input to the optical fiber amplifier, the intensity of the optical excitation signal 2̂ output from pump laser diode 220 can be properly adjusted and thus the optical transmission signal output from output terminal 212 can be stabilized. If, however, a very weak optical transmission signal 1̂ externally input to the optical fiber amplifier results in a weak optical transmission signal at output terminal 212, then the optical excitation signal 2̂ output from pump laser diode 220 should be increased in intensity. For this purpose, pump laser diode current controller 216 whould apply more amount of a negative control current, thereby imposing a heavy load on pump laser diode 220 and thus shortening the lifetime of pump laser diode 220.

Figure 3:
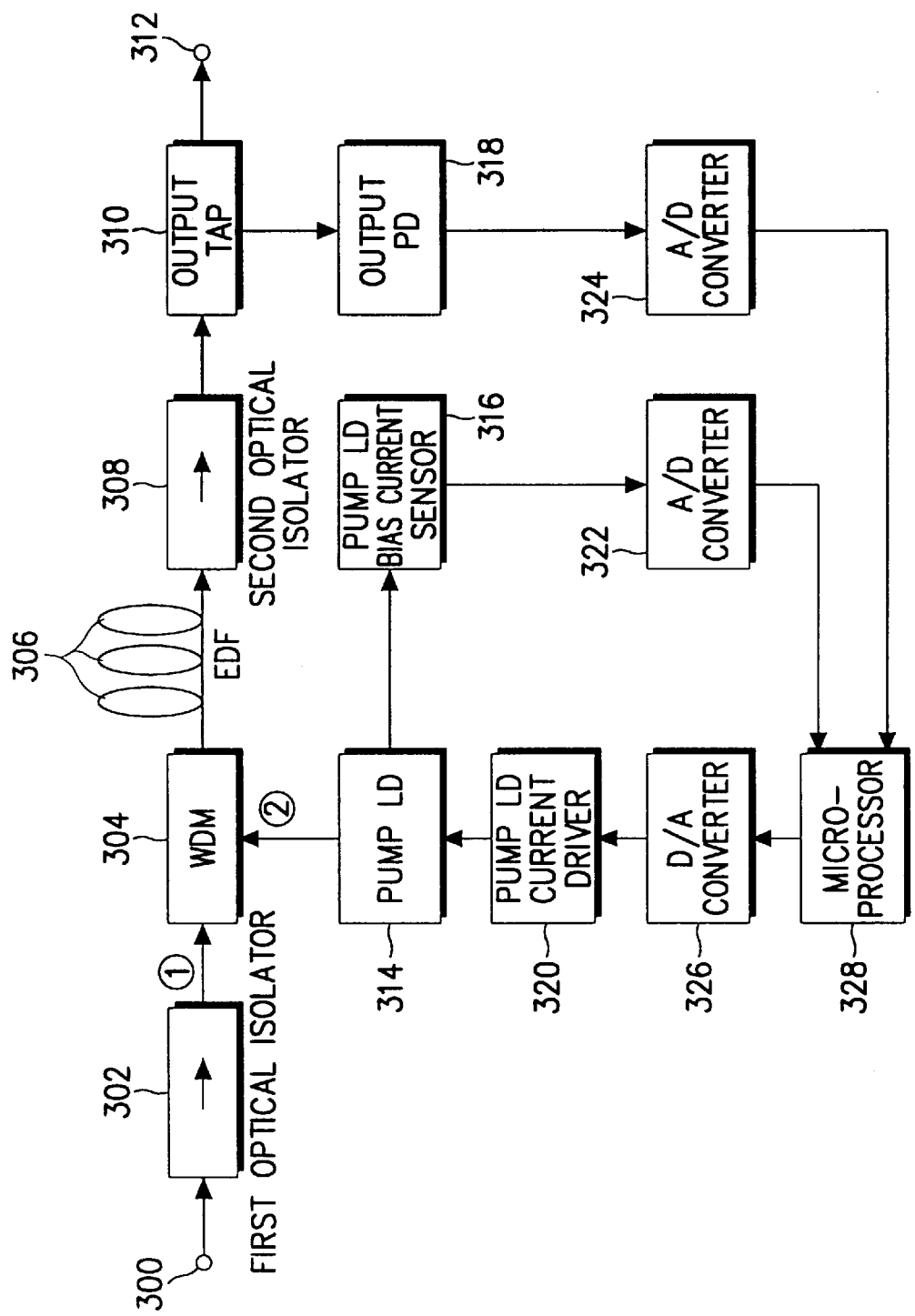
FIG. 3 is an exemplary block diagram of a digital automatic power controlling device using a photodiode at an output end in an optical fiber amplifier.

FIG. 3 is a block diagram of a third digital automatic power controlling device in an optical fiber amplifier, and also uses an output photodiode. Referring to FIG. 3, an output photodiode 318 detects part of a final output divided by an output tap 310. An A/D (Analog-to-Digital) converter 324 converts the optical signal received from output photodiode 318 to a digital signal. A microprocessor 328 compares the value of the digital signal received from A/D converter 324 with a predetermined reference output value, performs a negative feedback operation if the digital value is larger than the reference output value, and outputs a control signal to a D/A (Digital-to-Analog) converter 326, for reducing the final output level. If the digital value is smaller than the reference output value, microprocessor 328 outputs a control signal to D/A converter 326 by the negative feedback operation, for increasing the final output level. D/A converter 326 converts the digital values to analog signals. The analog signals activate a pump laser diode current driver 320 in such a way that the output of a pump laser diode 314 is reduced or increased and thus the final output of the optical fiber amplifier is constant. If the level of a bias current, sensed by a pump laser diode bias current sensor 316 and converted to a digital signal by an A/D converter 322, is larger than a pump laser diode bias current limit preset according to characteristics of the pump laser diode 314, the control operation is terminated. In this automatic power controlling device, when the output tap 310 and the output photodiode 318 are defective, the pump laser diode 314 is terminated, sometimes resulting in a failure in a transmission system. Therefore, the reliability of the automatic power controlling device is reduced.

Figure 4:
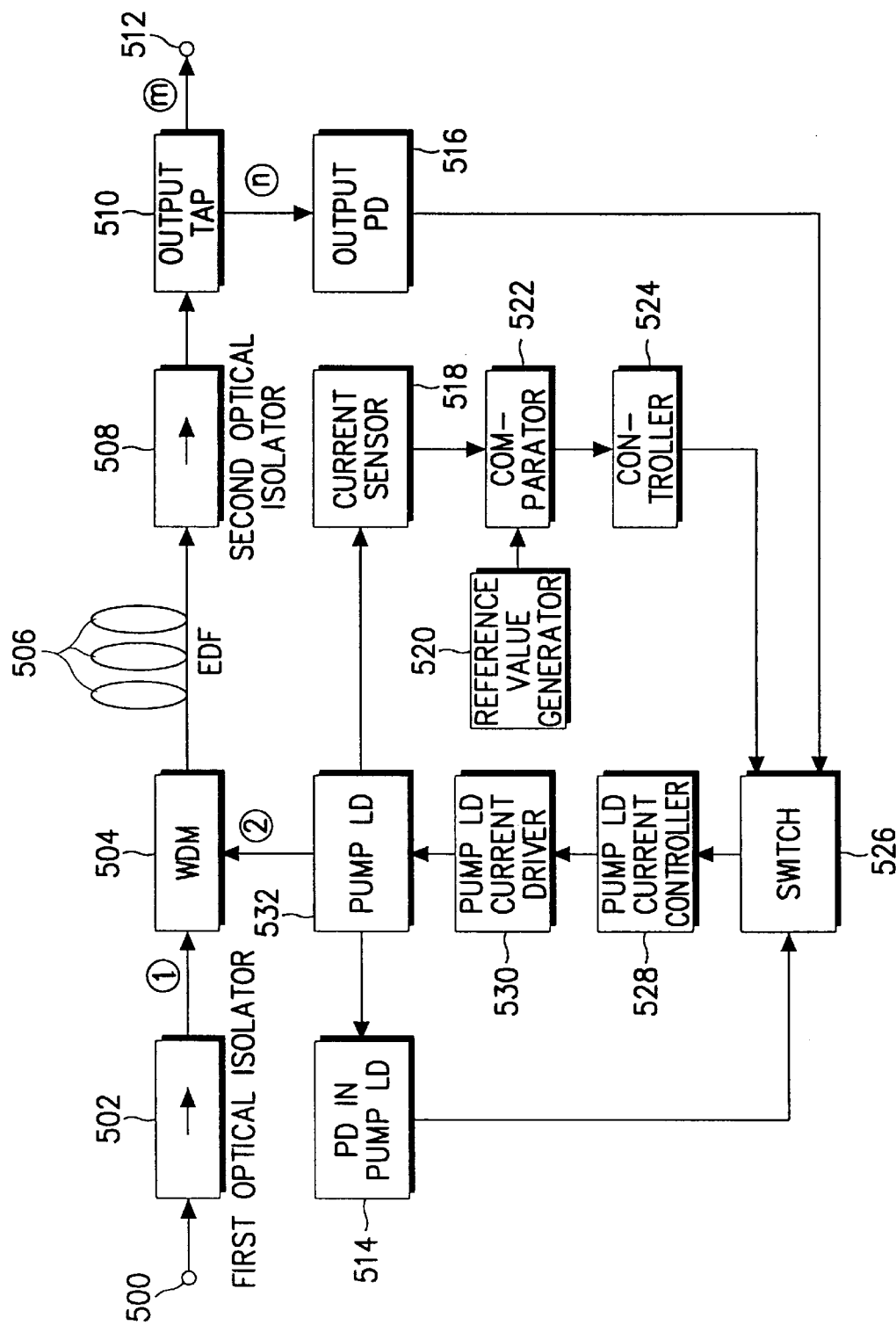
FIG. 4 is a block diagram of an optical fiber amplifier having an analog double automatic power controlling device according to an embodiment of the present invention.

FIG. 4 is a block diagram of an optical fiber amplifier having an analog double automatic power controlling device according to an embodiment of the present invention. Referring to FIG. 4, an input terminal 500 connects an outer optical fiber with an inner optical fiber in the optical fiber amplifier. An optical transmission signal is applied to a first optical isolator 502 via input terminal 500. The first optical isolator 502, having an input terminal and an output terminal, functions to pass an optical signal in a predetermined wavelength range and prevent reverse surge of an optical signal from an output end to an input end. Thus, the reverse surge of amplified spontaneous emission (ASE) of an EDF (erbium-doped fiber) 506 is prevented, thereby preventing distortion of an input optical signal in turn.

A WDM 504 multiplexes optical signals with different wavelengths, that is, an optical transmission signal $\hat{1}$ received from the first optical isolator 502 and an optical excitation signal $\hat{2}$ received from a pump laser diode 532 via different input terminals. The wavelengths of the optical transmission signal $\hat{1}$ and the optical excitation signal $\hat{2}$ are 1550 nm and 980 or 1480 nm, respectively. The optical excitation signal $\hat{2}$ is controlled by driving a pump laser diode current driver 530 under the control of a pump laser diode current controller 528. Then, the EDF 506 amplifies a multiplexed optical signal received from the WDM 504. Here, EDF 506 is obtained by doping an optical fiber with erbium (atomic number 68) being a rare earth metal, shows a high optical energy absorption rate in a specific wavelength such as 800, 980, 1480 nm, and has a dispersion spectrum with a bandwidth of 60 nm in a specific wavelength (1550 nm). The amplified optical signal is fed to an output tap 510 via a second optical isolator 508. The output tap 510 divides the received optical signal at a predetermined ratio of n:m (n=0.01, 0.1 or 0.2, m=0.99, 0.9 or 0.8, and n+m=1). The output $\hat{n}$ is applied to an output photodiode 516, for sensing the intensity of the optical transmission signal, and the output $\hat{m}$ is loaded on an outer optical fiber via an output terminal 512.

An analog double automatic power controlling loop according to the embodiment of the present invention will be described as follows.

In a first feedback control loop through the output photodiode 516, the optical signal $\hat{n}$ output from the output tap 510 is converted to an electrical signal by the output photodiode 516 and applied to the pump laser diode current controller 528 via a switch 526. The pump laser diode current controller 528 compares with the current level of the received electrical signal with a level preset by a user and controls the intensity of the optical excitation signal $\hat{2}$ output from the pump laser diode 532 on the basis of the comparison result, to thereby stabilize the final optical signal $\hat{m}$ output from the output terminal 512.

In a second feedback control loop, the optical excitation signal $\hat{2}$ output from the pump laser diode 532 to the WDM 504 is detected and converted to an electrical signal by a photodiode 514 in the pump laser diode 532, and applied to the pump laser diode current controller 528 via the switch 526. Then, the pump laser diode current controller 528 compares the current level of the electrical signal with a level preset by a user and controls the intensity of the optical excitation signal $\hat{2}$ output from the pump laser diode 532.

For efficient control of the above feedback control loops, a switch controlling unit is provided to control the switch 526 shared by the two feedback control loops. The switch controlling unit includes a current sensor 518, a comparator 522, a reference value generator 520, and a controller 524. A current flowing through the pump laser diode 532 is sensed by the current sensor 518 and output to the comparator 522. The comparator 522 compares the received current level with a reference level received from the reference value generator 520 and, if the current level is larger or smaller than the reference level, it outputs values corresponding to the two respective cases to the controller 524.

The controller 524 generates a switch control signal for controlling switch 526 on the basis of the received values. If the comparison result output from the comparator 522 is at a (+) level, the controller 524 determines that the output of the current sensor 518 is smaller than the reference level, and generates a switch control signal for switching the switch 526 to the first feedback control loop, that is, the output tap 510-the output photodiode 516-the switch 526-the pump laser diode current controller 528-and the pump laser diode current driver 530.

On the other hand, if the comparison result is at a (−) level, the controller 524 determines that the output of the current sensor 518 is larger than the reference level, and generates a switch control signal for switching the switch 526 to the second feedback control loop, that is, the pump laser diode 532-the photodiode 514-the switch 526-the pump laser diode current controller 528-and the pump laser diode current driver 530.

Figure 5:
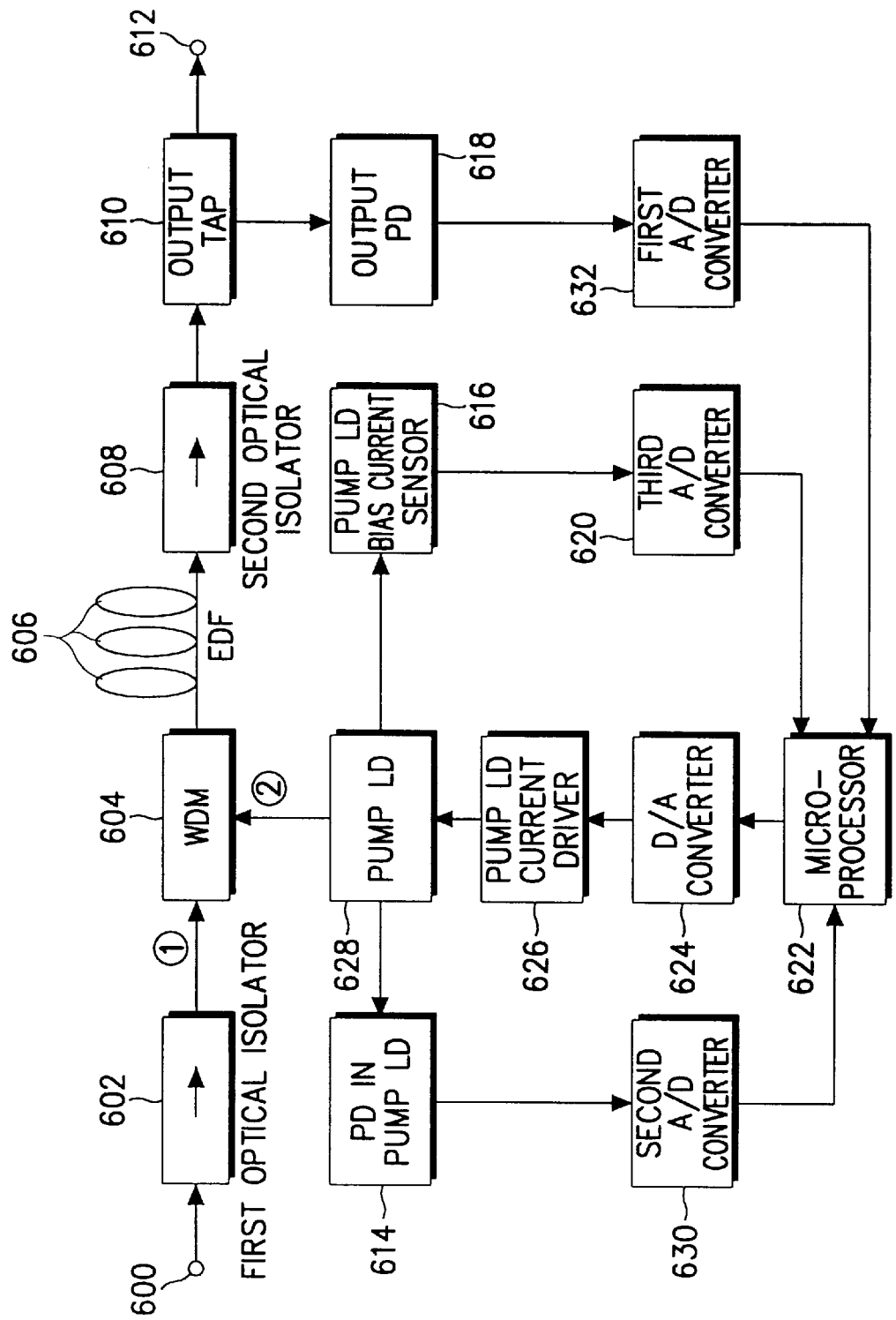
FIG. 5 is a block diagram of an optical fiber amplifier having a digital double automatic power controlling device according to another embodiment of the present invention.

FIG. 5 is a block diagram of an optical fiber amplifier having a digital double automatic power controlling device according to a second preferred embodiment of the present invention. Referring to FIG. 5, the digital double automatic power controlling device includes a first optical isolator 602 for preventing the reverse surge of ASE of an EDF 606. A WDM 604 multiplexes optical signals having different wavelengths via different input terminals and outputs the multiplexed signal via one optical fiber terminal. The rare-earth doped optical fiber 606 disperses an excited optical signal, a second optical isolator 608 blocks an optical signal reflected from an output tap 610 or a final output terminal 612, and the optical output tap 610 divides an output optical signal. A pump laser diode 628 generates an optical excitation signal, an output photodiode 618 detects the intensity of the output optical signal, and a pump laser diode bias current sensor 616 senses a bias current of the pump laser diode 628. A first A/D converter 632 converts the analog signal received from the output photodiode 618 to a digital signal, a second A/D converter 630 converts an analog signal received from a photodiode 614 in the pump laser diode 628 to a digital signal, and a third A/D converter 620 converts an analog signal received from the pump laser diode bias current sensor 616 to a digital signal. A microprocessor 622 generates a control signal to make the final output of the optical fiber amplifier or the optical excitation signal of the pump laser diode 628 constant. The pump laser diode 628 provides energy to the EDF 606 via WDM 604, the photodiode 614 is positioned in the pump laser diode 628 to sense the optical output of the pump laser diode 628, and a pump laser diode current driver 626 drives the pump laser diode 628. A D/A converter 624 converts the control signal received from the microprocessor 622 to an analog signal for activating the pump laser diode current driver 626.

To describe the digital double automatic power controlling device by units, the D/A converter 624 converts the digital control signal received from the microprocessor 622 to an analog signal, and the pump laser diode current driver 626 applies a driving current to the pump laser diode 628 on the basis of the analog signal, so that the pump laser diode 628 generates an appropriate optical excitation signal, in a pump laser diode driving unit. In a first feedback controlling unit, the output photodiode 618 detects an optical signal divided at a predetermined ratio by the output tap 610 and converts the optical signal to an analog electrical signal, and the first A/D converter 632 converts the analog signal to a digital signal and applies the digital signal to the microprocessor 622. In a second feedback controlling unit, the photodiode 614 detects the optical excitation signal output from the pump laser diode 628 and converts the optical excitation signal to an analog signal, and the second A/D converter 630 converts the analog signal to a digital signal and feeds the digital signal to the microprocessor 622. In a pump laser diode bias current sensing unit, the pump laser diode bias current sensor 616 senses a bias current of the pump laser diode 628, and the third A/D converter 620 converts the sensed analog signal to a digital signal and feeds the digital signal to the microprocessor 622. The microprocessor 622 compares the value of the digital signal received from the pump laser diode bias current sensing unit with a pump laser diode bias current limit set by a user. According to the comparison result, the microprocessor 622 controls the optical excitation signal output from the pump laser diode 628 on the basis of the digital signal received from the first feedback controlling unit and an initially set reference EDFA output value, to thereby stabilize the optical signal output from the final output terminal 612. Or, according to the comparison result, the microprocessor 622 keeps the optical excitation signal output from the pump laser diode 628 on the basis of the digital signal received from the second feedback controlling unit and a reference pump laser diode output value preset by a user.

The microprocessor 622 compares the pump laser diode bias current sensed by the pump laser diode bias current sensor 616 with a pump laser diode bias current limit initially set, and automatically controls power using the output photodiode 618 if the bias current value is smaller than the bias current limit. If the bias current value is larger than the bias current limit, the microprocessor 622 automatically controls power using the photodiode 614 in the pump laser diode 628. To describe in more detail, the microprocessor 622 sets a reference EDFA output value, a reference pump laser diode output value, and a pump laser diode bias current limit to their initial values, and reads the output of the EDFA via output photodiode 618 and first A/D converter 632. If the pump laser diode bias current value is smaller than the pump laser diode bias current limit, the microprocessor 622 reads the output of the output photodiode 618 via the first A/D converter 632 and controls the reference EDFA output value to be equal to an EDFA output. If the microprocessor 622 reads an EDFA output via output photodiode 618 and first A/D converter 632 and then compares a pump laser diode bias current value with the pump laser diode bias current limit, and the pump laser diode bias current value is larger than the pump laser diode bias current limit, then microprocessor 622 reads the output of the photodiode 614 via the second A/D converter 630 and controls the reference pump laser diode output value to be equal to a pump laser diode output. If the pump laser diode bias current value is still larger than the pump laser diode bias current limit even in the shifted controlling method using the photodiode 614, the control operation is terminated.

Figure 6A:
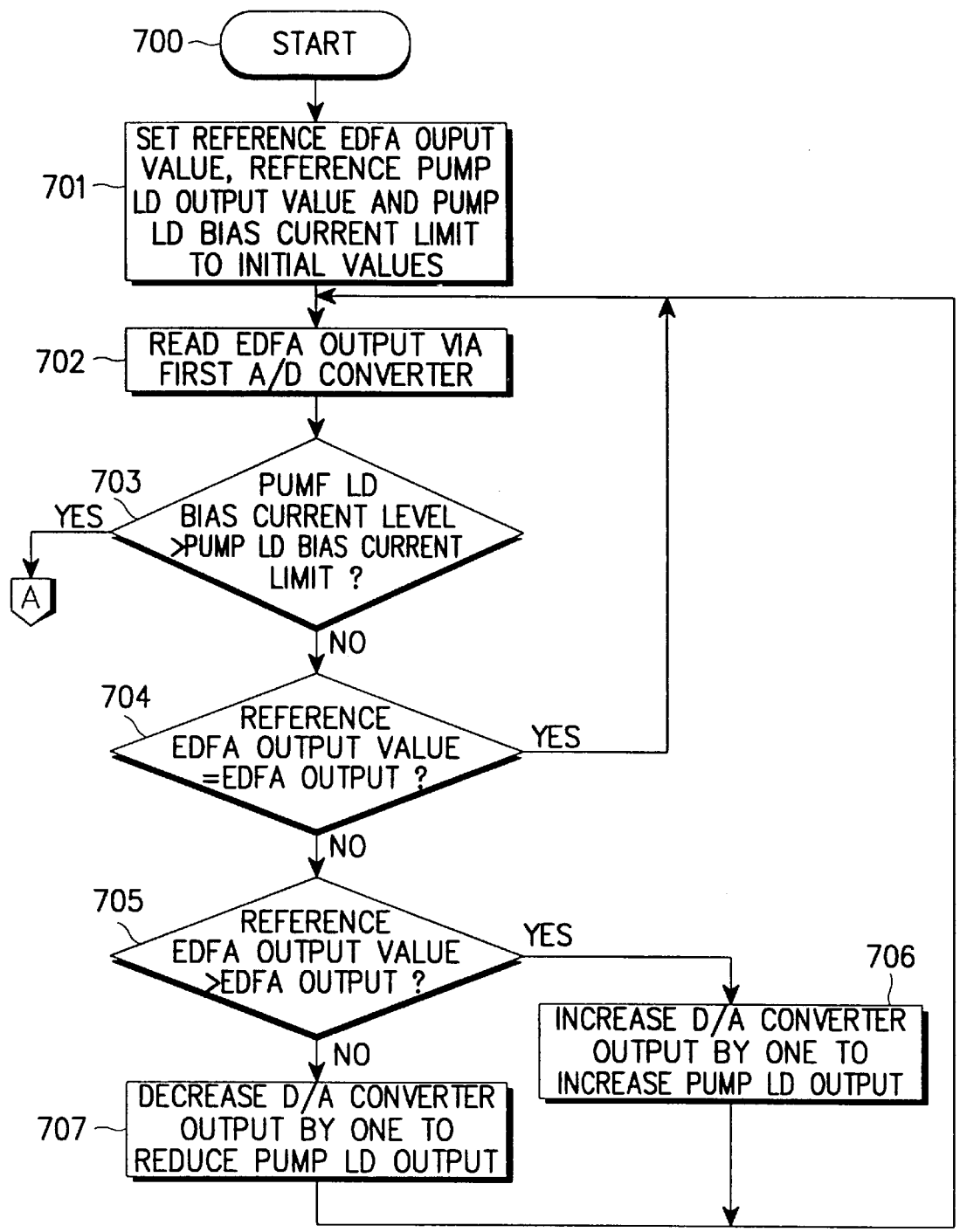
FIGS. 6A and 6B are a flowchart depicting a digital automatic power control operation of a microprocessor shown in FIG. 5.
Figure 6B:
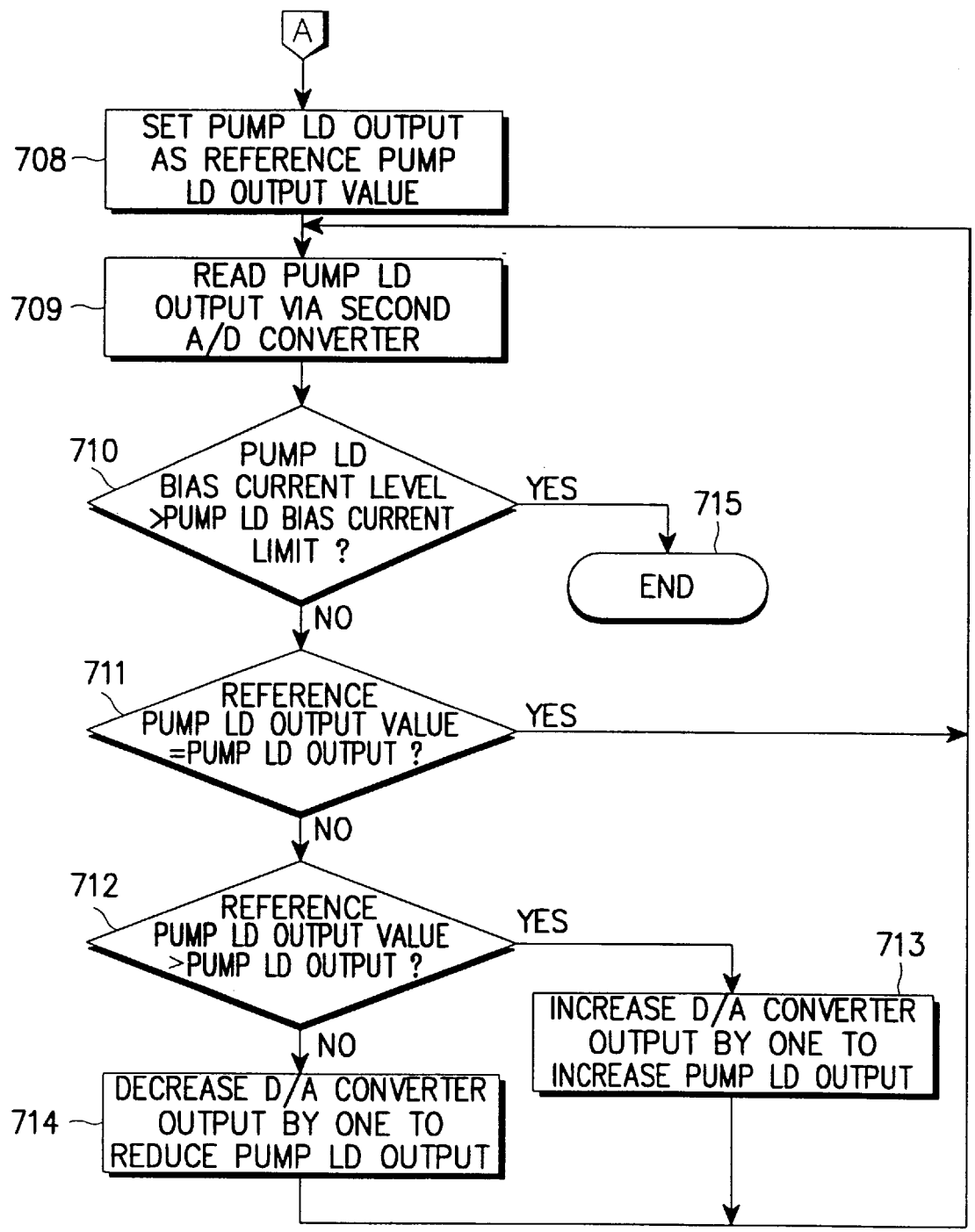

Referring to FIGS. 5, 6A and 6B, the automatic power controlling operation of the microprocessor 622 will be described in detail. When power is supplied to the EDFA, the microprocessor 622 starts to act in step 700, and sets a reference EDFA output value, a reference pump laser diode output value, and a pump laser diode bias current limit to their initial values in step 701. The microprocessor 622 receives an EDFA output from the first A/D converter 632 in step 702. In step 703, the microprocessor 622 compares a pump laser diode bias current level received via the pump laser diode bias current sensor 616 and the third A/D converter 620 with the initial pump laser diode bias current limit. If the pump laser diode bias current level is larger than the pump laser diode bias current limit, the procedure jumps to step 708. On the other hand, if the pump laser diode bias current level is not larger than the pump laser diode bias current limit, the procedure goes to step 704. In step 704, the reference EDFA output value is compared with the EDFA output read in step 702. If they are equal, the procedure returns to step 702. If they are different, it is determined whether the reference EDFA output value is larger than the EDFA output in step 705. If the reference EDFA output value is larger than the EDFA output, the output of the D/A converter 624 is increased by one step in step 706, so that the EDFA output is increased by one step and approaches the reference EDFA output value. Then, the procedure returns to step 702. On the contrary, if the EDFA output is larger than the reference EDFA output value, the output of the D/A converter 624 is decreased by one step in step 707 so that the EDFA output is decreased by one step and approaches the reference EDFA output value, and then the procedure goes back to step 702. The procedure repeatedly goes from step 704 back to step 702 under the condition that the pump laser diode bias current is not larger than the pump laser diode bias current limit in step 703, and the EDFA output is equal to the reference EDFA output value. Thus, the EDFA output can be kept equal to the reference EDFA output value at every moment. The procedure repeatedly goes from step 706 or step 707 back to step 702 under the condition that the pump laser diode bias current level is not larger than the pump laser diode bias current limit in step 703, and the EDFA output is different from the reference EDFA output value in step 704, to thereby instantaneously make the EDFA output equal to the reference EDFA output value.

When the pump laser diode bias current level is larger than the pump laser diode bias current limit at any moment during the repeated procedures, microprocessor 622 goes to step 708. In step 708, a pump laser diode output obtained at the moment when the pump laser diode bias current is larger than the pump laser diode bias current limit in step 703 is set as a reference pump laser diode output value. In step 709, the output of the pump laser diode 628 is read via photodiode 614 and second A/D converter 630. In step 710, a pump laser diode bias current level is compared with a pump laser diode bias current level limit. If the pump laser diode bias current level is larger than the pump laser diode bias current level limit, the control operation is terminates in step 715. If the pump laser diode bias current level is not lager than the pump laser diode bias current level limit, the reference pump laser diode output value is compared with a pump laser diode output, in step 711. If they are equal, the procedure returns to step 709. If they are different, it is determined whether the reference pump laser diode output value is larger than the pump laser diode output, in step 712. If the reference pump laser diode output value is larger than the pump laser diode output, the output of the D/A converter 624 is increased by one step, in step 713, so that the pump laser diode output is increased by one step and approaches the reference pump laser diode output value, and then the procedure returns to step 709. If the pump laser diode output is larger than the reference pump laser diode output value, the output of the D/A converter 624 is decreased by one step, in step 714, so that the pump laser diode output is decreased by one step and approaches the reference pump laser diode output value, and then the procedure goes back to step 709. The microprocessor 622 repeatedly goes from step 711 to step 709 under the condition that the pump laser diode bias current level is not larger than the pump laser diode bias current limit in step 710, and the pump laser diode output is equal to the reference pump laser diode output value, to thereby keep the pump laser diode output equal to the reference pump laser diode output value at every moment. The microprocessor 622 repeatedly goes from step 713 or 714 to step 709 under the condition that the pump laser diode bias current level is not larger than the pump laser diode bias current limit in step 710, and the pump laser diode output is different from the reference pump laser diode output value in step 711, to thereby instantaneously make the pump laser diode output equal to the reference pump laser diode output value. When the pump laser diode bias current level is larger than the pump laser diode bias current limit in step 710 during the repeated procedures, the controlling operation is terminated in step 715.

In conclusion, the present invention can stabilize an optical signal output via a final output terminal in an optical fiber amplifier by selecting a first feedback control loop using an output photodiode or a second feedback control loop using a photodiode provided in a pump laser diode, and controlling an optical excitation signal output from the pump laser diode on the basis of the intensity of an output optical signal detected through the selected feedback control loop in an analog or digital double automatic controlling method.

As described above, the present invention has the advantages: (1) automatic power control using an output photodiode leads to a stable final output of the optical fiber amplifier despite a possible variation in the power of an input optical signal and temperature; (2) the output photodiodeusing control mode automatically shifts to an automatic power controlling mode using a photodiode provided in a pump laser diode when defective parts result in a system failure, thereby increasing system reliability; and (3) a digital automatic power control as in the second embodiment renders the optical fiber amplifier compatible with a changed environment and facilitates an interface between the optical fiber amplifier and the outside.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. An analog double automatic power controlling device in an optical fiber amplifier having two optical isolators respectively positioned at input and output ends, for preventing reverse surge of an optical transmission signal, a wavelength division multiplexer for multiplexing an externally input optical transmission signal and an optical excitation signal, a pump laser diode for generating the excitation signal, and an output tap at the output end, for dividing an amplified optical signal at a predetermined ratio, comprising:

a pump laser diode controlling portion for driving the pump laser diode to output the optical excitation signal, and automatically controlling the intensity of the excitation signal on the basis of the level of a fed-back signal;

a first feed-back controlling portion for detecting an optical signal divided at the predetermined ratio via the output tap, converting the optical signal to a first electrical signal;

a second feed-back controlling portion for detecting the optical excitation signal output from the pump laser diode controlling portion, converting the optical excitation signal to a second electrical signal;

a switch for switching to connect one of the first and second electrical signals to the pump laser diode controlling portion; and a switch controlling portion for sensing a current flowing through the pump laser diode, comparing a sensed current level with a predetermined reference current level, and generating a switch controlling signal for output to the switch on the basis of the comparison result, for causing the switch to select one of the first and second electrical signals as the fed-back signal for input to the pump laser diode controlling portion.

2. The analog double automatic power controlling device as set forth in claim 1, said pump laser diode controlling portion comprising:

a pump laser diode current driver for driving the pump laser diode; and a pump laser diode current controller for applying a control current to the pump laser diode current driver to control the intensity of the optical excitation signal output from the pump laser diode in response to the fed-back signal.

3. The analog double automatic power controlling device as set forth in claim 1, said first feed-back controlling portion comprising:

an output photodiode for detecting the optical signal divided at the predetermined ratio by the output tap, converting the optical signal to said first electrical signal, and applying said first electrical signal to said switch.

4. The analog double automatic power controlling device as set forth in claim 1, said second feed-back controlling portion comprising:

a photodiode provided in the pump laser diode, for detecting the intensity of the optical excitation signal output from the pump laser diode, converting the detected intensity to said second electrical signal, and applying said second electrical signal to said switch.

5. The analog double automatic power controlling device as set forth in claim 1, said switch controlling portion comprising:

a current sensor for sensing the intensity of a current flowing through the pump laser diode and outputting said sensed current level, a comparator for comparing the sensed current level received from the current sensor with a user predetermined reference current level; and a switch controller for generating said switch controlling signal on the basis of the comparison result.

6. The analog double automatic power controlling device as set forth in claim 5, wherein the switch controller generates said switch controlling signal for selecting said first electrical signal upon input of a comparison result from the comparator, indicating that the sensed current level is larger than the reference current level, and generates said switch controlling signal for selecting said second electrical signal upon input of a comparison result from the comparator, indicating that the sensed current level is not greater than the reference current level.

7. A digital double automatic power controlling device in an optical fiber amplifier having two optical isolators respectively positioned at input and output ends, for preventing reverse surge of an optical transmission signal, a wavelength division multiplexer for multiplexing an externally input optical transmission signal and an optical excitation signal, a pump laser diode for generating the excitation signal, and an output tap at the output end, for dividing an amplified optical signal at a predetermined ratio, said device comprising:

a pump laser diode driving portion for converting a digital control signal to an analog signal and applying a driving current to the pump laser diode on the basis of the analog signal, for causing the pump laser diode to output said optical excitation signal;

a first feed-back controlling portion for detecting an optical signal divided at the predetermined ratio by the output tap, converting the optical signal to a first analog signal, and converting the first analog signal to a first digital signal;

a second feed-back controlling portion for detecting the optical excitation signal output from the pump laser diode, converting the excitation signal to a second analog signal, and converting the second analog signal to a second digital signal;

a pump laser diode bias current sensing portion for sensing a bias current of the pump laser diode and converting a third analog signal indicative of said sensed bias current to a third digital signal; and a microprocessor for comparing the level of the third digital signal with a user preset bias current limit and, according to a comparison result, generating said digital control signal on the basis of a comparison between said first digital signal and an initially set reference output value of the optical fiber amplifier, to thereby keep a final output optical signal constant, or generating said digital control signal on the basis of a comparison between said second digital signal and a reference pump laser diode output value initially set by a user.

8. The digital double automatic power controlling device as set forth in claim 7, said pump laser diode driving portion comprising:

a digital-to-analog converter for converting the digital control signal received from the microprocessor to said analog signal; and a pump laser diode current driver for applying said driving current to the pump laser diode in response to said analog signal on the basis of the level of the digital signal received from the digital-to-analog converter to cause the pump laser diode to output an appropriate optical excitation signal.

9. The digital double automatic power controlling device as set forth in claim 7, said first feed-back controlling portion comprising:

an output photodiode for detecting the optical signal divided at the predetermined ratio by the output tap and converting the optical signal to said first analog signal; and an analog-to-digital converter for converting the first analog signal received from the output photodiode to said first digital signal and applying the first digital signal to the microprocessor.

10. The digital double automatic power controlling device as set forth in claim 8, said second feed-back controlling portion comprising:

a photodiode provided in the pump laser diode, for detecting the optical excitation signal output from the pump laser diode and converting the optical excitation signal to said second analog signal; and an analog-to-digital converter for converting the second analog signal to said second digital signal and applying the second digital signal to the microprocessor.

11. The digital double automatic power controlling device as set forth in claim 8, said pump laser diode bias current sensing portion comprising:

a bias current sensor for sensing a bias current of the pump laser diode and outputting said third analog signal; and an analog-to-digital converter for converting the third analog signal to said third digital signal and applying the third digital signal to the microprocessor.

12. The digital double automatic power controlling device as set forth in claim 8, wherein said microprocessor determines whether said third digital signal is greater than said user preset bias current limit, and when said third digital signal is determined not to be greater than said user preset bias current limit, increases an output step of said digital-to-analog converter by one when said comparison of said first digital signal and said initially set reference output value of the optical fiber amplifier determines that said initially set reference output value of the optical fiber amplifier is greater than said first digital signal and decreases an output step of said digital-to-analog converter by one when said comparison of said first digital signal and said initially set reference output value of the optical fiber amplifier determines that said initially set reference output value of the optical fiber amplifier is not greater than said first digital signal.

13. The digital double automatic power controlling device as set forth in claim 9, wherein said microprocessor determines whether said third digital signal is greater than said user preset bias current limit, and when said third digital signal is determined not to be greater than said user preset bias current limit, increases an output step of said digital-to-analog converter by one when said comparison of said first digital signal and said initially set reference output value of the optical fiber amplifier determines that said initially set reference output value of the optical fiber amplifier is greater than said first digital signal and decreases an output step of said digital-to-analog converter by one when said comparison of said first digital signal and said initially set reference output value of the optical fiber amplifier determines that said initially set reference output value of the optical fiber amplifier is not greater than said first digital signal.

14. The digital double automatic power controlling device as set forth in claim 8, wherein said microprocessor determines whether said third digital signal is greater than said user preset bias current limit, and when said third digital signal is determined to be greater than said user preset bias current limit, increases an output step of said digital-to-analog converter by one when said comparison of said second digital signal and said reference pump laser diode output value determines that said reference pump laser diode output value is greater than said second digital signal and decreases an output step of said digital-to-analog converter by one when said comparison of said second digital signal and said reference pump laser diode output value determines that said reference pump laser diode output value is not greater than said second digital signal.

15. The digital double automatic power controlling device as set forth in claim 10, wherein said microprocessor determines whether said third digital signal is greater than said user preset bias current limit, and when said third digital signal is determined to be greater than said user preset bias current limit, increases an output step of said digital-to-analog converter by one when said comparison of said second digital signal and said reference pump laser diode output value determines that said reference pump laser diode output value is greater than said second digital signal and decreases an output step of said digital-to-analog converter by one when said comparison of said second digital signal and said reference pump laser diode output value determines that said reference pump laser diode output value is not greater than said second digital signal.

16. A double automatic power controlling device in an optical fiber amplifier having two optical isolators respectively positioned at input and output ends, for preventing reverse surge of an optical transmission signal, a wavelength division multiplexer for multiplexing an externally input optical transmission signal and an optical excitation signal, a pump laser diode for generating the excitation signal, and an output tap at the output end, for dividing an amplified optical signal at a predetermined ratio, comprising:

a pump laser diode controlling portion for driving the pump laser diode to output the optical excitation signal, and automatically controlling the intensity of the excitation signal on the basis of the level of a fed-back signal;

a first feed-back controlling portion for detecting an optical signal divided at the predetermined ratio via the output tap, converting the optical signal to a first feedback signal;

a second feed-back controlling portion for detecting the optical excitation signal output from the pump laser diode controlling portion, converting the optical excitation signal to a second feedback signal;

control means for sensing a current flowing through the pump laser diode, comparing a sensed current level with a predetermined reference current level;

means responsive to a comparison result output of said control means and further responsive to one of said first and second feedback signals to control said pump laser diode controlling portion.

17. The device as set forth in claim 16, said pump laser diode controlling portion comprising:

a pump laser diode current driver for driving the pump laser diode; and a pump laser diode current controller for applying a control current to the pump laser diode current driver to control the intensity of the optical excitation signal output from the pump laser diode in response to the fed-back signal.

18. The device as set forth in claim 17, wherein said means responsive to a comparison result output of said control means and further responsive to one of said first and second feedback signals to control said pump laser diode controlling portion comprises a switch for selecting one of said first and second feedback signals, as the fed-back signal, in response to said output of said control means.

19. The device as set forth in claim 17, wherein said means responsive to a comparison result output of said control means and further responsive to one of said first and second feedback signals to control said pump laser diode controlling portion comprises:

a first analog-to-digital for converting said first feedback signal to a first digital signal;

a second analog-to-digital for converting said second feedback signal to a second digital signal;

a third analog-to-digital converter for converting said comparison result output of said control means to a third digital signal; and a microprocessor a microprocessor for comparing the level of the third digital signal with a user preset bias current limit and, according to a comparison result, generating a digital control signal on the basis of a comparison between said first digital signal and an initially set reference output value of the optical fiber amplifier, to thereby keep a final output optical signal constant, or generating said digital control signal on the basis of a comparison between said second digital signal and a reference pump laser diode output value initially set by a user.

20. The device as set forth in claim 19, said pump laser diode current controller comprising a digital-to-analog converter for converting said digital control signal an analog driving signal for controlling said pump laser diode current driver.

21. The device as set forth in claim 17, said first feed-back controlling portion comprising an output photodiode for detecting the optical signal divided at the predetermined ratio by the output tap and converting the optical signal to said first feedback signal.

22. The device as set forth in claim 17, said second feed-back controlling portion comprising a photodiode, provided in the pump laser diode, for detecting the intensity of the optical excitation signal output from the pump laser diode and converting the detected intensity to said second feedback signal.

23. The device as set forth in claim 20, said first feed-back controlling portion comprising an output photodiode for detecting the optical signal divided at the predetermined ratio by the output tap and converting the optical signal to said first feedback signal.

24. The device as set forth in claim 23, said second feed-back controlling portion comprising a photodiode, provided in the pump laser diode, for detecting the intensity of the optical excitation signal output from the pump laser diode and converting the detected intensity to said second feedback signal.

25. The device as set forth in claim 18, said control means for sensing a current flowing through the pump laser diode comprising:

a current sensor for sensing the intensity of a current flowing through the pump laser diode and outputting said sensed current level;

a comparator for comparing the sensed current level received from the current sensor with a user predetermined reference current level; and a switch controller for generating a switch controlling signal on the basis of the comparison result.

26. The device as set forth in claim 25, wherein the switch controller generates said switch controlling signal for selecting said first feedback signal upon input of a comparison result from the comparator, indicating that the sensed current level is larger than the reference current level, and generates said switch controlling signal for selecting said second feedback signal upon input of a comparison result from the comparator, indicating that the sensed current level is not greater than the reference current level.

27. The device as set forth in claim 20, said control means for sensing a current flowing through the pump laser diode comprising:

a bias current sensor for sensing a bias current of the pump laser diode and outputting said third analog signal; and an analog-to-digital converter for converting the third analog signal to said third digital signal and applying the third digital signal to the microprocessor.

28. The digital double automatic power controlling device as set forth in claim 27, wherein said microprocessor determines whether said third digital signal is greater than said user preset bias current limit, and when said third digital signal is determined not to be greater than said user preset bias current limit, increases an output step of said digital-to-analog converter by one when said comparison of said first digital signal and said initially set reference output value of the optical fiber amplifier determines that said initially set reference output value of the optical fiber amplifier is greater than said first digital signal and decreases an output step of said digital-to-analog converter by one when said comparison of said first digital signal and said initially set reference output value of the optical fiber amplifier determines that said initially set reference output value of the optical fiber amplifier is not greater than said first digital signal.

29. The device as set forth in claim 27, wherein said microprocessor determines whether said third digital signal is greater than said user preset bias current limit, and when said third digital signal is determined to be greater than said user preset bias current limit, increases an output step of said digital-to-analog converter by one when said comparison of said second digital signal and said reference pump laser diode output value determines that said reference pump laser diode output value is greater than said second digital signal and decreases an output step of said digital-to-analog converter by one when said comparison of said second digital signal and said reference pump laser diode output value determines that said reference pump laser diode output value is not greater than said second digital signal.

* * * * *